US012694482B2

(12) United States Patent　　　　(10) Patent No.: US 12,694,482 B2
Chou et al.　　　　　　　　　　　　(45) Date of Patent: Jul. 28, 2026

(54) LIGHT-EMITTING DIODE (LED) FLICKER DETECTION BASED ON STRUCTURED DIFFERENTIAL MOTION ESTIMATION UNDER HIGH DYNAMIC RANGE (HDR) IMAGES

(71) Applicant: CISTA SYSTEM CORP., Grand Cayman (KY)

(72) Inventors: Yang-Ting Chou, Zhubei City (TW); Zhaojian Li, Fremont, CA (US)

(73) Assignee: Cista System Corp., Grand Cayman (KY)

( * ) Notice: Subject to any disclaimer, the term of this patent is extended or adjusted under 35 U.S.C. 154(b) by 337 days.

(21) Appl. No.: 18/590,720

(22) Filed: Feb. 28, 2024

(65) Prior Publication Data

US 2025/0272792 A1　　Aug. 28, 2025

(51) Int. Cl.
　G06T 5/50　　　　(2006.01)
　G06T 5/90　　　　(2024.01)
　　　　　(Continued)

(52) U.S. Cl.
　CPC .................. G06T 5/50 (2013.01); G06T 5/90 (2024.01); G06T 7/0002 (2013.01); G06T 7/13 (2017.01); G06T 7/246 (2017.01); *G06T 2207/10144* (2013.01); *G06T 2207/20208* (2013.01); *G06T 2207/20221* (2013.01)

(58) Field of Classification Search
　CPC .......... G06T 5/50; G06T 5/90; G06T 7/0002; G06T 7/13; G06T 7/246; G06T 2207/10144; G06T 2207/20208; G06T 2207/20221
　See application file for complete search history.

(56) References Cited

U.S. PATENT DOCUMENTS 10,325,359 B2 *　6/2019　Dewhurst .............. G06V 20/58
11,490,029 B2 *　11/2022　Herman .................. H04W 4/40
　　　　　　　(Continued)

OTHER PUBLICATIONS

Behmann, Nicolai, et al. "Selective LED Flicker Detection and Mitigation Algorithm for Non-HDR Video Sequences." 2018 IEEE 8th International Conference on Consumer Electronics-Berlin (ICCE-Berlin). IEEE, 2018. (Year: 2018).*

*Primary Examiner* — Utpal D Shah
(74) *Attorney, Agent, or Firm* — Sheppard Mullin Richter & Hampton LLP

(57) ABSTRACT

This application describes an image processing system and method for LED Flicker Mitigation (LFM). An example method involves capturing multiple frames of a scene using an image sensor configured with various exposure settings. Based on the pixel values in the frames, the edges of a changing object may be identified in each frame, which could be a moving object or an LED source. It then determines the object's moving path between two frames captured with different exposure settings. The amount of movement of the changing object is calculated based on this moving path. The system then estimates the likelihood of the changing object being either the moving object or the LED source, based on the amount of movement. Finally, an image of the scene is generated using the captured frames by performing High Dynamic Range (HDR) fusion and LFM, taking into account the likelihood of the changing object's identity.

20 Claims, 12 Drawing Sheets

800

810 obtaining a plurality of frames of a scene captured by an image sensor configured with a plurality of exposure settings 820 determining edges of a changing object in the scene based on pixel values in the plurality of frames, wherein the changing object comprises a moving object or an LED source 830 determining a moving path of the changing object between a first frame captured using a shorter exposure setting and a second frame captured using a longer exposure setting based on pixel values of the edges of the changing object in the first frame and the second frame 840 determining an amount of movement of the changing object based on the moving path of the changing object 850 determining, based on the amount of movement of the changing object, a likelihood of the changing object being the moving object or the LED source 860 generating an image of the scene using the plurality of frames by performing High Dynamic Range (HDR) fusion and LFM based on the likelihood of the changing object being the moving object or the LED source

(51) Int. Cl.
    *G06T 7/00*         (2017.01)
    *G06T 7/13*         (2017.01)
    *G06T 7/246*      (2017.01)

(56)            References Cited

U.S. PATENT DOCUMENTS

| | | | |
|---|---|---|---|
| 2017/0148148 A1* | 5/2017 | Okuyama | G06T 5/50 |
| 2019/0208106 A1* | 7/2019 | Lukac | G06T 5/94 |
| 2019/0335079 A1* | 10/2019 | Koizumi | H04N 25/587 |
| 2021/0014402 A1* | 1/2021 | Nossek | H04N 23/73 |
| 2021/0392261 A1* | 12/2021 | Nossek | G06T 5/94 |
| 2023/0171510 A1* | 6/2023 | Lindgren | H04N 23/745 |
| | | | 348/148 |
| 2024/0214692 A1* | 6/2024 | Dey | H04N 23/71 |

* cited by examiner

310 A plurality of frames of a scene captured using different exposure time settings 320 Structured Differential Motion Estimation Module 322 Differential determination 324 Motion position estimation 326 Structured motion search 328 Motion weighting estimation 330 HDR and/or LFM to generate the final image of the scene

[Motion Pattern]

| $L_0$ | 26 | 27 | 25 | 26 | 28 | 29 | 29 | 28 | 35 | 38 | 33 | 28 | 30 | 45 |
|---|---|---|---|---|---|---|---|---|---|---|---|---|---|---|
| $L_1$ | 599 | 360 | 172 | 204 | 401 | 415 | 280 | 69 | 43 | 34 | 34 | 37 | 40 | 46 |
| $L_2$ | 169 | 157 | 146 | 135 | 119 | 120 | 129 | 134 | 128 | 112 | 112 | 131 | 202 | 432 |
| $L_3$ | 1023 | 1023 | 904 | 651 | 590 | 563 | 576 | 642 | 740 | 880 | 950 | 964 | 939 | 784 |

[LED Pattern]

| $L_0$ | 6 | 6 | 6 | 6 | 6 | 6 | 6 | 6 | 6 | 6 | 6 | 6 | 6 | 4 |
|---|---|---|---|---|---|---|---|---|---|---|---|---|---|---|
| $L_1$ | 19 | 18 | 18 | 17 | 16 | 18 | 20 | 21 | 21 | 20 | 19 | 17 | 18 | 18 |
| $L_2$ | 90 | 80 | 78 | 70 | 70 | 73 | 73 | 77 | 78 | 96 | 96 | 86 | 64 | 77 |
| $L_3$ | 952 | 844 | 984 | 1003 | 1008 | 1010 | 1014 | 1023 | 1023 | 1023 | 1023 | 1023 | 1023 | 1023 |

700 Original Vectors of pixel intensities

[Motion Pattern]

| $L_{01}$ | 108 | 112 | 104 | 108 | 116 | 120 | 120 | 116 | 145 | 158 | 137 | 116 | 125 | 187 |
|---|---|---|---|---|---|---|---|---|---|---|---|---|---|---|
| $L_{12}$ | 1023 | 1023 | 688 | 816 | 1023 | 1023 | 800 | 276 | 172 | 136 | 136 | 148 | 160 | 184 |
| $L_{23}$ | 676 | 628 | 584 | 540 | 476 | 480 | 516 | 536 | 512 | 452 | 448 | 524 | 808 | 1023 |

[LED Pattern]

| $L_{01}$ | 25 | 25 | 25 | 25 | 25 | 25 | 25 | 25 | 25 | 25 | 25 | 25 | 25 | 16 |
|---|---|---|---|---|---|---|---|---|---|---|---|---|---|---|
| $L_{12}$ | 76 | 72 | 72 | 68 | 64 | 72 | 80 | 84 | 84 | 80 | 76 | 68 | 72 | 72 |
| $L_{23}$ | 360 | 320 | 312 | 280 | 280 | 292 | 292 | 308 | 312 | 384 | 384 | 344 | 336 | 308 |

710 Luminance Aligned Vectors of pixel intensities

FIG. 7A

720 Differential calculation

Movement amount = 307

Movement amount = 1700

730 Amount of movement

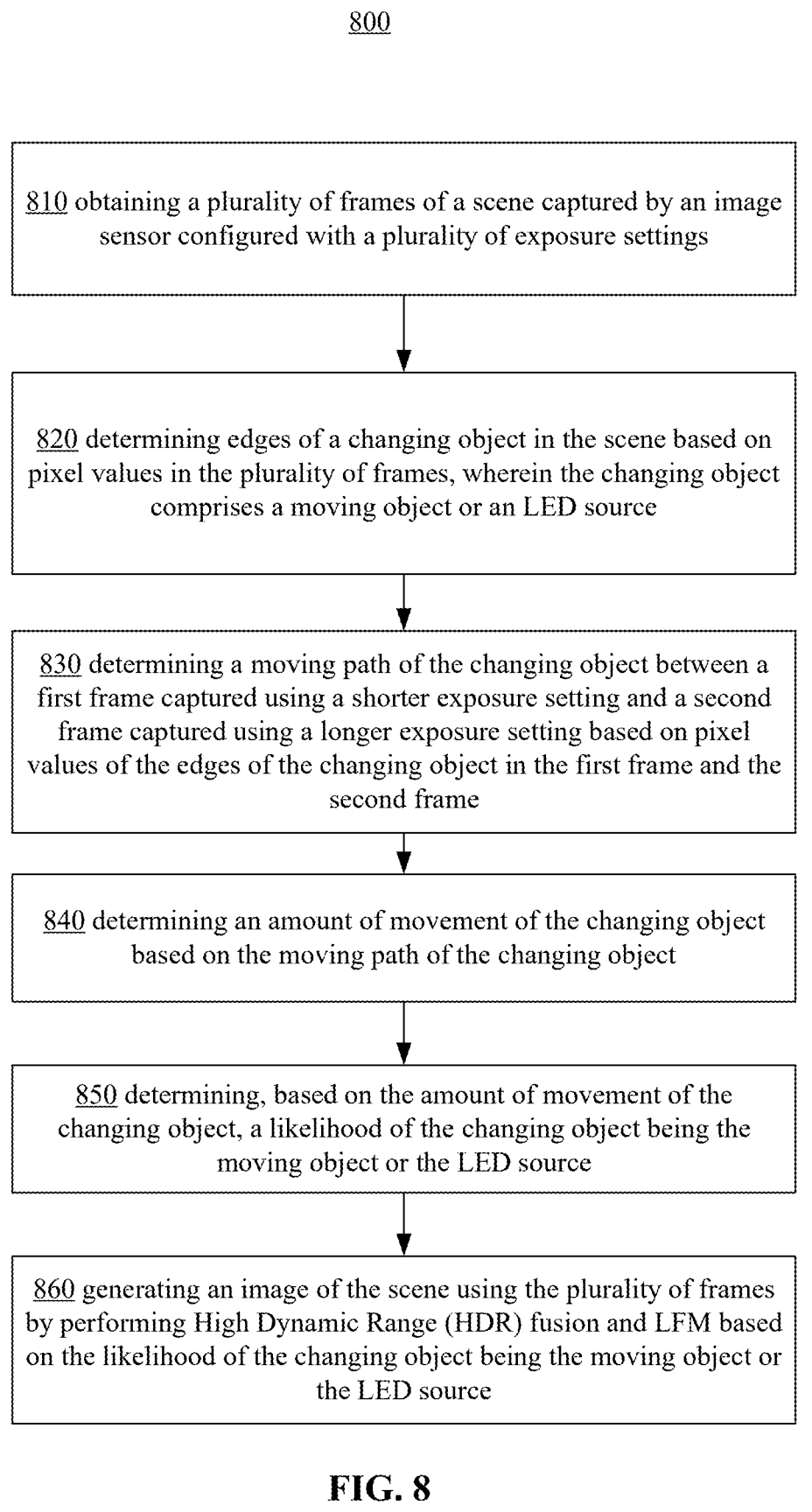

800

810 obtaining a plurality of frames of a scene captured by an image sensor configured with a plurality of exposure settings 820 determining edges of a changing object in the scene based on pixel values in the plurality of frames, wherein the changing object comprises a moving object or an LED source 830 determining a moving path of the changing object between a first frame captured using a shorter exposure setting and a second frame captured using a longer exposure setting based on pixel values of the edges of the changing object in the first frame and the second frame 840 determining an amount of movement of the changing object based on the moving path of the changing object 850 determining, based on the amount of movement of the changing object, a likelihood of the changing object being the moving object or the LED source 860 generating an image of the scene using the plurality of frames by performing High Dynamic Range (HDR) fusion and LFM based on the likelihood of the changing object being the moving object or the LED source

FIG. 8

LIGHT-EMITTING DIODE (LED) FLICKER DETECTION BASED ON STRUCTURED DIFFERENTIAL MOTION ESTIMATION UNDER HIGH DYNAMIC RANGE (HDR) IMAGES

TECHNICAL FIELD

The disclosure relates generally to apparatus, system, and method for detecting and mitigating LED flicker within HDR imagery.

BACKGROUND

The burgeoning use of light-emitting diode (LED) light sources, driven by the pursuit of energy efficiency, has given rise to a notable technical challenge-flicker artifacts. These artifacts manifest when the imaging timing of a camera (e.g., an automotive camera for the purpose of autonomous driving) fails to synchronize with the pulse-width modulated (PWM) LED frequency of the object in focus, such as car headlights or traffic signs. This lack of alignment can impede the back-end recognition application from effectively identifying the object.

Addressing this issue presents two primary challenges. The first is the complexity involved in pinpointing the location of the LED flicker on the screen. The LED's position often closely mirrors that of moving objects, complicating the task of distinguishing between the two. The second challenge lies in the limitations of the most sophisticated solution currently available for mitigating LED flicker. This solution, which involves assigning different sensitivities to sensors based on their exposures, is not universally applicable to all sensors and has considerable constraints.

This disclosure describes a structured differential motion estimation algorithm designed to differentiate between the LED and moving objects by utilizing High Dynamic Range (HDR) frames of scenes. Such a solution would not only enhance the overall user experience in various applications but also advance the capabilities of vision-based technologies across multiple domains.

SUMMARY

Various embodiments of this specification may include hardware circuits, systems, and methods for detecting and mitigating LED flicker within HDR imagery.

Some implementations herein relate to an image processing method. For example, the image processing method may include obtaining a plurality of frames of a scene captured by an image sensor configured with a plurality of exposure settings. The method may also include determining edges of a changing object in the scene based on pixel values in the plurality of frames, where the changing object may include a moving object or an LED source. The method may furthermore include determining a moving path of the changing object between a first frame captured using a shorter exposure setting and a second frame captured using a longer exposure setting based on pixel values of the edges of the changing object in the first frame and the second frame. The method may in addition include determining an amount of movement of the changing object based on the moving path of the changing object. The method may moreover include determining, based on the amount of movement of the changing object, a likelihood of the changing object being the moving object or the LED source.

Method may also include generating an image of the scene using the plurality of frames by performing High Dynamic Range (HDR) fusion and LFM based on the likelihood of the changing object being the moving object or the LED source. Other embodiments of this aspect include corresponding computer systems, apparatus, and computer programs recorded on one or more computer storage devices, each configured to perform the actions of the methods.

The described implementations may also include one or more of the following features. The method where the determining the likelihood of the changing object being the moving object or the LED source may include: in response to the amount of movement being greater than a first threshold, determining that the changing object is likely the LED source; and in response to the amount of movement being smaller than a second threshold, determining that the changing object is likely the moving object.

The method where the generating the image of the scene may include: in response to the amount of movement being greater than a first threshold, performing LFM by using pixels of the changing object in a frame that is captured under a longest exposure setting to generate the image of the scene.

The method where the generating the image of the scene may include: in response to the amount of movement being smaller than a second threshold, using an HDR fusion result of the plurality of frames as the image of the scene.

The method where the generating the image of the scene may include: in response to the amount of movement being between a first threshold and a second threshold, generating the image of the scene based on a weighted sum of (1) pixel values of the changing object in a frame that is captured under a longest exposure setting and (2) an HDR fusion result of the plurality of frames.

The method where the determining the edges of the changing object in the scene based on pixel values in the plurality of frames may include: performing intra-frame iteration to determine the edges, where the intra-frame iteration may include: within a frame captured with one of the plurality of exposure settings, using a search window to iterate through pixels within the frame; and determining a pixel value differential of a pixel centered within the search window based on pixel values of the pixel and neighboring pixels, wherein the pixel value differential of the pixel indicates a rate of intensity change across neighboring pixels, where pixels in the frame with pixel value differentials greater than a threshold are determined as part of the edges of the changing object in the frame.

The method where the determining the moving path of the changing object between the first frame captured using the shorter exposure setting and the second frame captured using the longer exposure setting may include: performing cross-frame iteration to determine the moving path, where the cross-frame iteration may include: identifying, in the first frame captured with the shorter exposure setting, a first cluster of pixels having a pixel with a largest differential in the first frame; searching for, using a moving search window in the second frame with the longer exposure setting, a second cluster of pixels corresponding to the first cluster of pixels in the first frame, where the first cluster of pixels and the second cluster of pixels have a smallest difference; identifying, in the second frame with the longer exposure setting, a third cluster of pixels with a largest differential in the second frame; searching for, using a moving search window in the first frame with the shorter exposure setting, a fourth cluster of pixels corresponding to the third cluster of pixels in the second frame; determining corresponding clusters of pixels between the first frame and the second frame based on differences between the first cluster of pixels and the second cluster of pixels, and between the third cluster of pixels and the fourth cluster of pixels; and determining the moving path between the first frame and the second frame based on the corresponding clusters of pixels.

The method where the determining the amount of movement of the changing object based on the moving path of the changing object may include: determining a largest movement of the changing object between different frames as the amount of movement of the changing object using a hierarchical motion search, where the hierarchical motion search excludes the amount of movement when corresponding pixel values in the moving path approximate saturation within a threshold.

The method where the capturing the plurality of frames of the scene using the plurality of exposure settings may include: capturing the plurality of frames of the scene using a spatially multiplexed image sensor, where the spatially multiplexed image sensor may include a plurality of pixel groups, each pixel group may include a plurality of pixels configured with the plurality of exposure settings, and the plurality of frames respectively corresponds to a plurality of exposure settings.

The method where the plurality of exposure settings correspond to linearly increased exposure times by a predetermined factor.

The method where the determining edges of the changing object in the scene may include: performing pixel intensity alignment between a pair of the plurality of frames by using the predetermined factor, thereby obtaining a plurality of vectors of aligned pixel intensities for the pair of frames. Implementations of the described techniques may include hardware, a method or process, or a computer tangible medium.

Some implementations herein relate to a system. For example, the system may include one or more processors and one or more non-transitory computer-readable memories coupled to the one or more processors and configured with instructions executable by the one or more processors to cause the system to perform the actions of the above-described methods.

Some implementations herein relate to a non-transitory computer-readable storage medium. For example, the non-transitory computer-readable storage medium may be configured with instructions executable by one or more processors to cause the one or more processors to perform the actions of the above-described methods.

These and other features of the systems, methods, and hardware devices disclosed, and the methods of operation and functions of the related elements of structure and the combination of parts and economies of manufacture will become more apparent upon consideration of the following description and the appended claims referring to the drawings, which form a part of this specification, where like reference numerals designate corresponding parts in the figures. It is to be understood, however, that the drawings are for illustration and description only and are not intended as a definition of the limits of the invention.

BRIEF DESCRIPTION OF THE DRAWINGS

FIG. 6 illustrates an exemplary motion weighting process in the structured differential estimation method, according to some embodiments of this specification.

FIGS. 7A and 7B illustrate an exemplary implementation of the structured differential estimation method in distinguishing LED flickers and moving objects, according to some embodiments of this specification.

FIG. 8 illustrates an exemplary structured differential estimation method for detecting LED flickers and moving objects within HDR imagery, according to some embodiments of this specification.

DETAILED DESCRIPTION

The specification is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present specification. Thus, the specification is not limited to the embodiments shown, but is to be accorded the widest scope consistent with the principles and features disclosed herein.

When using cameras or image sensors to capture a scene that involves both LED light sources and moving objects, the pixels corresponding to the LED light sources and the moving objects may have changing pixel brightnesses (or called pixel intensities) at different time points. This is because LED light sources may cause LED flickers, resulting in fluctuations in pixel intensities, while moving objects may gradually change position, causing varying pixel brightness values. Here, the moving object may include moving things such as vehicles, airplanes, drones, robots, a moving light source that is not an LED source (e.g., incandescent lights, halogen lights, fluorescent lights, Compact Fluorescent lights (CFLs), HID lights (High-Intensity Discharge), Neon lights, Laser Diodes) or any other moving objects.

This application harnesses the distinct pixel intensity patterns associated with LED flickers and moving objects to effectively differentiate the pixels covering the LED sources from those covering the moving objects. Subsequently, different image processing methods can be applied to these distinct groups of pixels to generate optimal High Dynamic Range (HDR) images, preserving both the details of the moving objects and the vibrant illumination provided by the LED light sources.

Figure 1A:
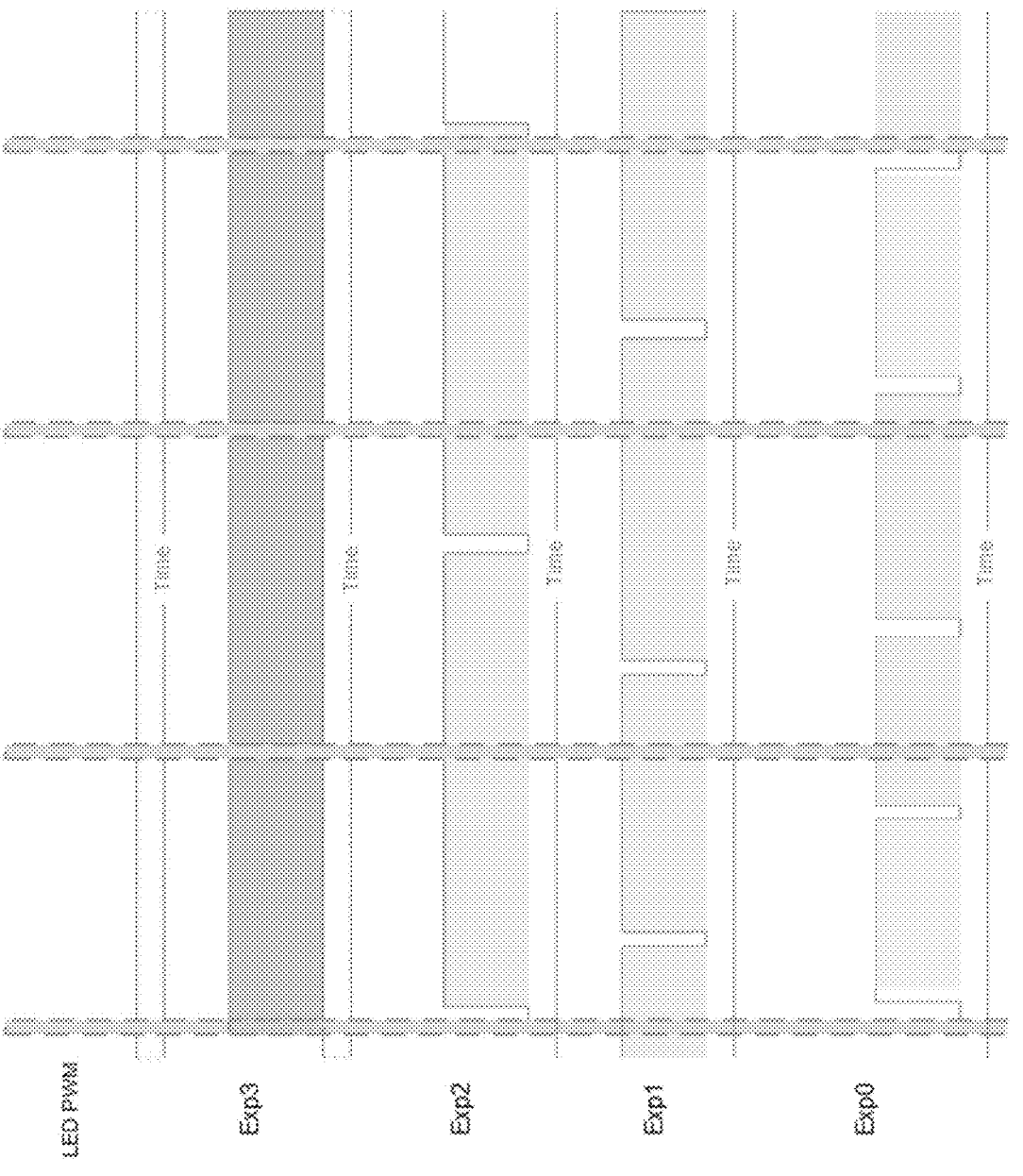
FIG. 1A illustrates capturing a scene of LED light source (s) using an image sensor with different exposure settings.

FIG. 1A illustrates capturing a scene of LED light source(s) using an image sensor with different exposure settings. As explained in the background section, flickering is a common occurrence in LED light sources, such as traffic signals and signboards, due to their repetitive ON/OFF cycles. These fluctuations in light intensity, although not visible to the human eye, can be detected by sensors designed to pick up such flickers. When exposed to these fluctuations, sensors may incorrectly interpret the working condition of LED light sources, adversely affecting the performance of embedded vision systems.

For example, autonomous vehicles rely on cameras to detect and interpret traffic signals, including those illuminated by LED lights; many urban areas now use LED streetlights for energy efficiency. Autonomous vehicles navigating roads at night encounter different street lighting conditions, including flickering LED lights. Surveillance cameras in public places like airports, train stations, and shopping malls might encounter flickering LED lights from various sources, such as display panels, advertising boards, or decorative lighting. Modern sports arenas use LED lighting systems for energy efficiency. Cameras capturing live sports events need to contend with the flickering caused by these LED lights.

As shown in FIG. 1A, the LED Pulse Width Modulation (PWM) has ON/OFF cycles. An image sensor with a long exposure time (e.g., Exp3) has a better chance to capture more ON cycles of the LED light source, yielding a more accurate representation of the light source's true operational state. Conversely another image sensor with a shorter exposure time (e.g., Exp2 or Exp0) may miss some of the On cycles of the LED light source, leading to an inconsistent depiction of the LED's illumination. In other words, setting a longer exposure time allows the sensor to collect light over an extended period, increasing the probability of capturing more ON cycles of the LED. This results in a more stable and continuous illumination representation in the captured image.

However, despite the advantages of longer exposure times, there are disadvantages to consider. Longer exposures lead to the sensor capturing more light, potentially causing overexposure. Overexposed images lose details in bright areas, significantly impacting image quality. Moreover, in environments with varying light sources, longer exposures might introduce motion blur or capture unintended light sources, further complicating the image capture process. Given these practical limitations, relying solely on longer exposure times for LED LFM purposes is not practical.

Figure 1B:
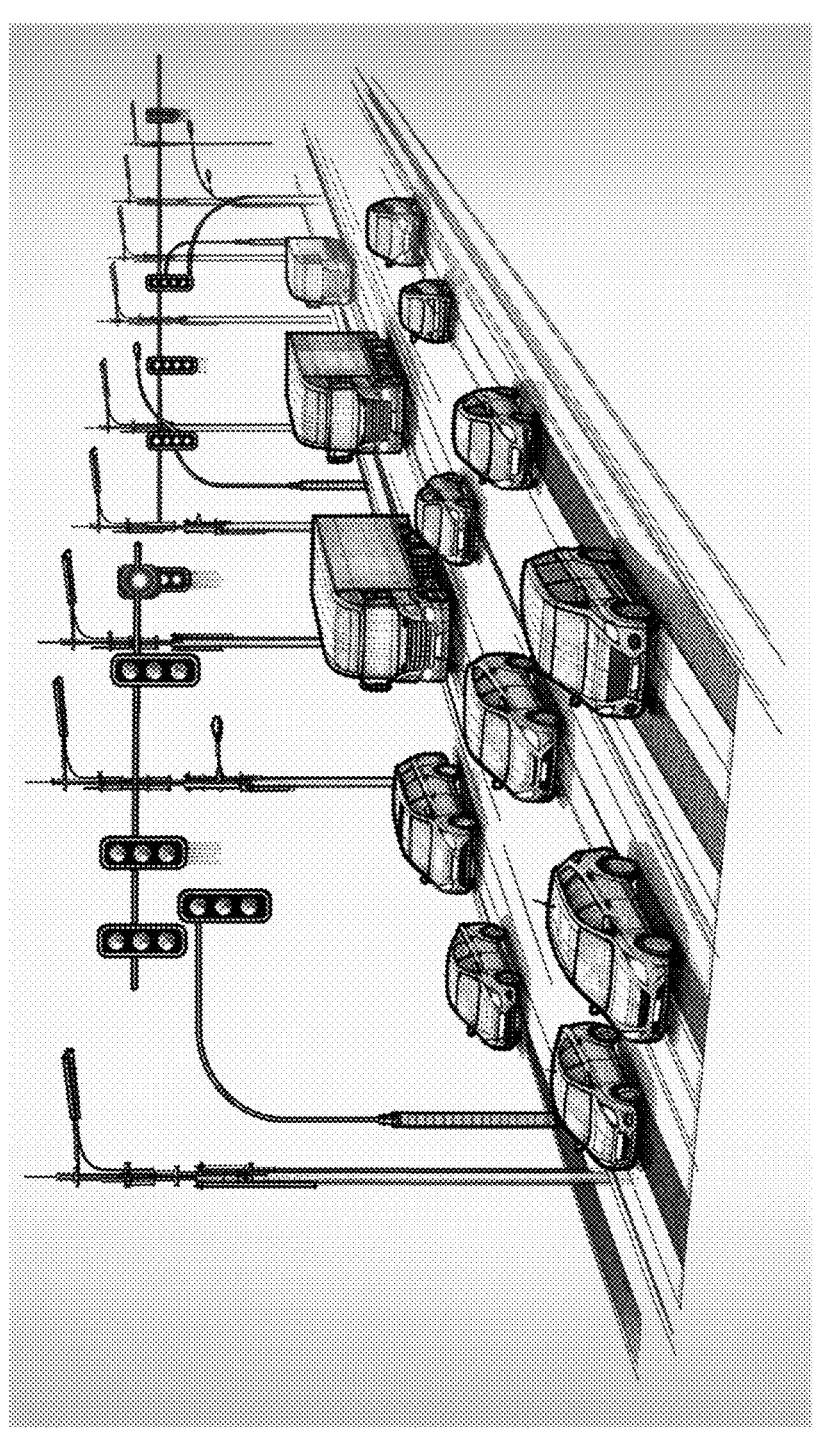
FIG. 1B illustrates a real-world scenario where LED flickering coincides with the presence of moving objects, presenting a formidable challenge for on-vehicle monitoring cameras or surveillance cameras in their endeavor to produce the most effective HDR images.

FIG. 1B illustrates a real-world scenario where LED flickering coincides with the presence of moving objects, presenting a formidable challenge for on-vehicle monitoring cameras or surveillance cameras in their endeavor to produce the most effective HDR images.

As explained in the background section, capturing a scene with both LED light sources and moving objects presents a unique set of challenges for image sensors due to the presence of LED flickers and the motion of objects. In particular, the combination of LED flickers and moving objects results in two sources of pixel brightness variations occurring simultaneously. Image sensors need to differentiate between these variations caused by LED flickers and those caused by moving objects to effectively capture the scene. This necessitates advanced algorithms and image processing techniques that can analyze the temporal patterns of pixel intensity changes and attribute them to their respective sources. Addressing these challenges is crucial to ensuring that images captured in such scenarios accurately represent both the LED light sources and the moving objects within the scene, ultimately leading to high-quality results.

FIG. 1B illustrates a traffic scene as just one typical scenario where LED light sources and moving objects interact. Other examples could include a warehouse equipped with LED lighting, where carts and objects are in constant motion, or a stadium bathed in the glow of intense LED floodlights during evening sports events. In all these scenarios, it's crucial for monitoring cameras and video systems to effectively distinguish between LED light sources and moving objects. This distinction is essential for the accurate application of LED Flicker Mitigation (LFM) or High Dynamic Range (HDR) fusion techniques, ensuring clear and precise visual capture in environments where LED lighting and movement coexist.

Figure 1C:
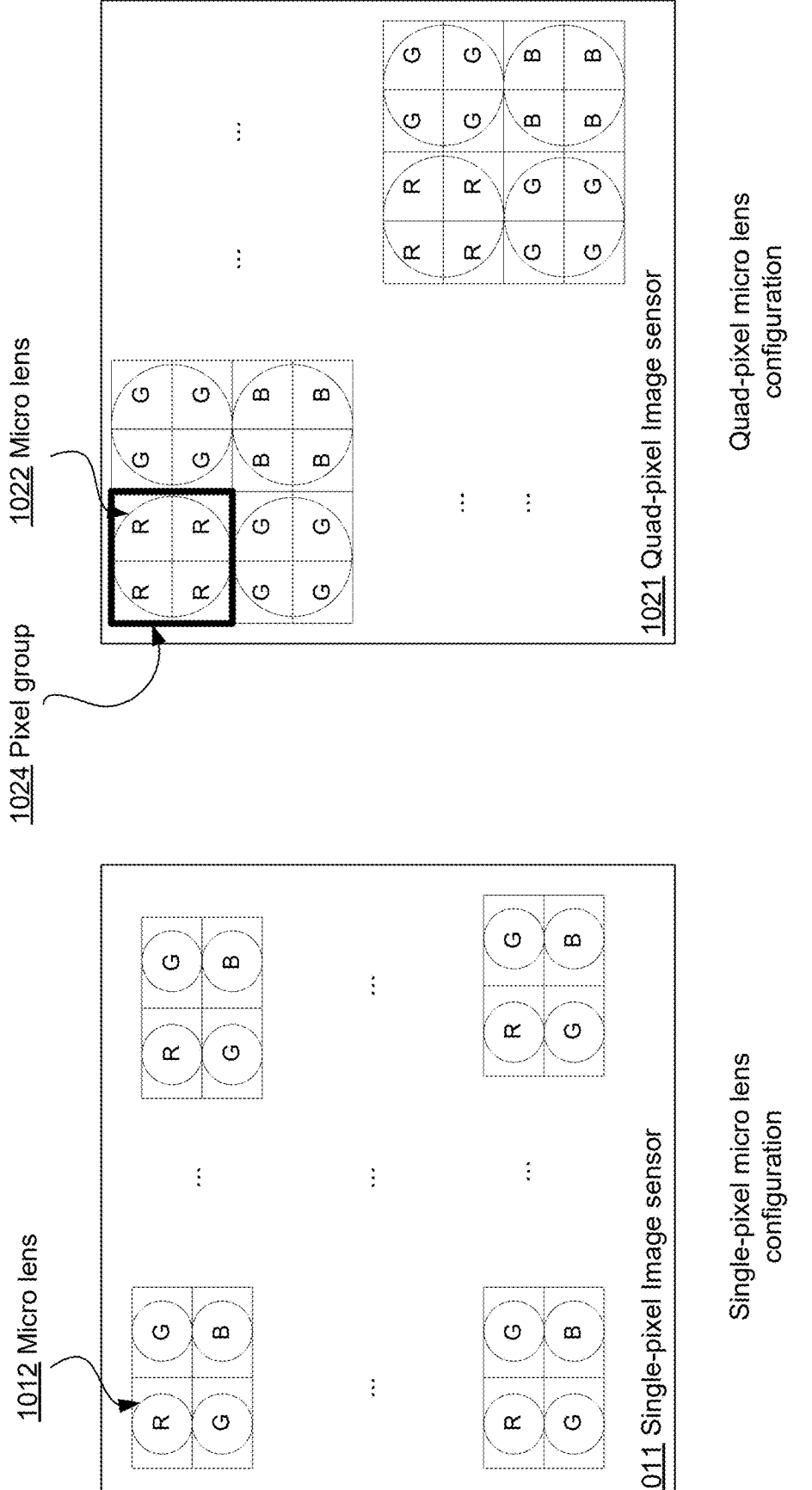
FIG. 1C illustrates exemplary spatially multiplexed image sensors, according to some embodiments of this specification.

The method described in this application utilizes spatially multiplexed image sensors or other types of image sensors capable of capturing the same scene with multiple frames of different exposure settings. FIG. 1C illustrates exemplary spatially multiplexed image sensors, according to some embodiments of this specification. A spatially multiplexed image sensor may have a matrix of pixels in a group. A common example is quad-pixel image sensor with quad-pixel units, also called quadruple (or quad), each of which includes four pixels arranged in a square or rectangular pattern.

In some embodiments, the pixels within the same group capture the different colors (using different color filters), such as the single-pixel image sensor 1011. In some embodiments, the pixels within the same group capture the same color (using the same color filters), such as the quad-pixel image sensor 1021.

Each spatially multiplexed image sensor may include a plurality of microlenses covering the pixels. A microlens is a small lens designed to focus light onto a corresponding pixel beneath it. The size of a microlens may vary, particularly in high-resolution sensors with small pixel dimensions, and can be on the order of a few micrometers (µm) to align with the scale of the pixels it serves. A typical microlens may be a single element with one flat surface and one curved (spherical convex or other shapes) surface to refract the light. The plurality of microlenses are sometimes arranged as an array, such as a one-dimensional or two-dimensional array on a supporting substrate. Single micro-lenses may be used to couple light to the covered pixels or photodiodes; microlens arrays may be used to increase the light collection efficiency of CCD or CMOS image sensors, to collect and focus light that would have otherwise fallen onto the non-sensitive areas of the sensors.

Different spatially multiplexed image sensors may have different microlens configurations for each pixel group. FIG. 1C illustrates a single-pixel microlens configuration in the image sensor 1011, and a quad-pixel microlens configuration in the image sensor 1021. In the single-pixel microlens configuration, the pixels in the image sensor 1011 are respectively covered by microlenses 1012 for coupling lights to the covered pixels. In contrast, in the quad-pixel microlens configuration, one microlens 1022 is configured to cover a two-by-two matrix of pixels 1024 (also called a pixel group), and the pixels in the pixel group 1024 are covered with color filters of the same color.

The following figures and descriptions introduce the LFM method using a spatially multiplexed image sensor. For simplicity, the LFM method assumes that the spatially multiplexed image sensor can have different exposure configurations at pixel-level, regarding less how the pixels or microlenses are configured.

Figure 2:
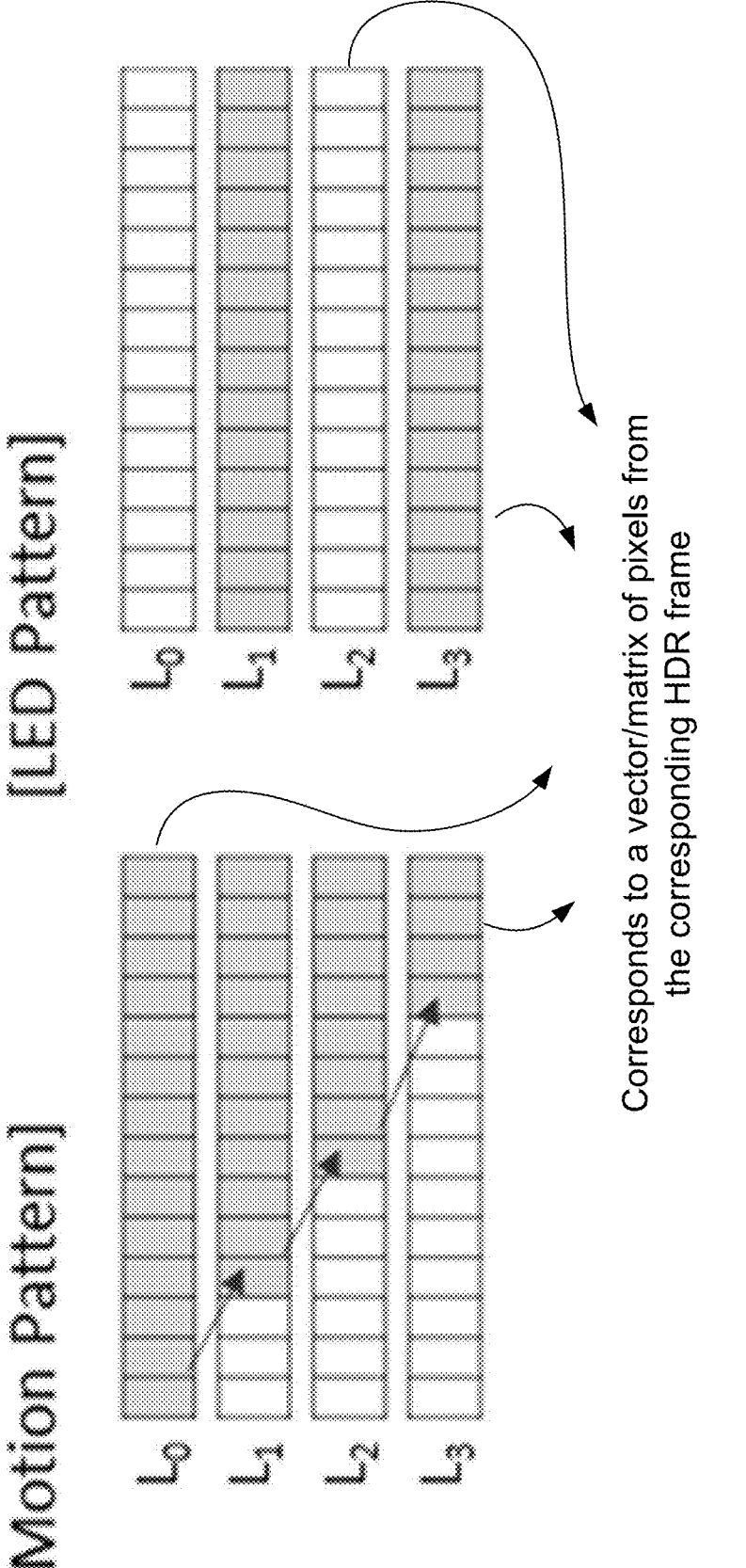
FIG. 2 illustrates different pixel intensity patterns respectively corresponding to a moving object and an LED light source, according to some embodiments of this specification.

FIG. 2 illustrates different pixel intensity patterns respectively corresponding to a moving object and an LED light source, according to some embodiments of this specification.

When a spatially multiplexed image sensor is used to capture a scene (such as the quad-pixel image sensor illustrated in FIG. 1C), the multiple pixels within the same pixel group may be configured with different exposure times (e.g., from short exposure to long exposure) to capture multiple frames of the same scene. The pixels using the same exposure setting across all pixel groups may form one HDR frame. These frames may be referred to as HDR frames or exposure bracketed frames.

As an example shown in FIG. 2, a quad-pixel image sensor uses four different exposure settings (L0, L1, L2, and L3 within the same quadruple) to capture a scene. The four exposure settings respectively generate four HDR frames. Each of the vectors in FIG. 2 represent a vector (or a matrix) of pixels from one HDR frame, and each value in the vectors represents a pixel intensity value (e.g., brightness).

As illustrated by the motion patterns in FIG. 2, when an object is in motion (as captured in a moving motion), the pixel intensities of the object under varying exposure settings (ranging from a shorter exposure L0 to a longer exposure L3) can exhibit a progressively altering pattern, known as a motion vector. For instance, in FIG. 2's motion pattern, the count of dark pixels incrementally increases with longer exposure times from L0 to L3. Conversely, when capturing an LED light source under these varying exposures, the pixel response is distinctly different. The pixels either entirely capture the LED's ON cycle (resulting in all pixels being illuminated), or they capture the OFF cycle (leading to all pixels appearing dark). Consequently, the pixel intensity pattern associated with the LED light source resembles a cyclical fluctuation; for example, in FIG. 2's LED pattern, the L0 vector is entirely dark, while the L1 vector is fully bright. This indicates that the motion energy of pixels capturing the LED light source is significantly higher than that of pixels capturing a moving object.

In the course of experiments, the inventors discovered that basing the identification of motion vectors solely on the intensities of individual pixels often leads to oversensitivity and can result in errors due to outlier data. To mitigate this problem, a structured differential motion estimation method was introduced, designed to reduce impulse noise through the application of four-step workflow, including differential calculation, motion position estimation, structured motion search, and motion weighting estimation. During implementation, these four steps may be combined into fewer steps, further divided into more steps, executed in an overlapping fashion (e.g., partially in parallel) or sequentially.

In this design, this differential-based structured motion search is crucial in enhancing motion vector detection by effectively reducing high-frequency noise and smoothing out outliers, thus mitigating oversensitivity and errors. For example, the adoption of the searching window during the structured motion search step makes it easier for algorithms to discern and analyze motion patterns by averaging pixel movement and reducing the impact of extreme fluctuations.

This results in stabilized motion vector calculations and minimizes aliasing effects, which can occur in digital imaging.

Figure 3:
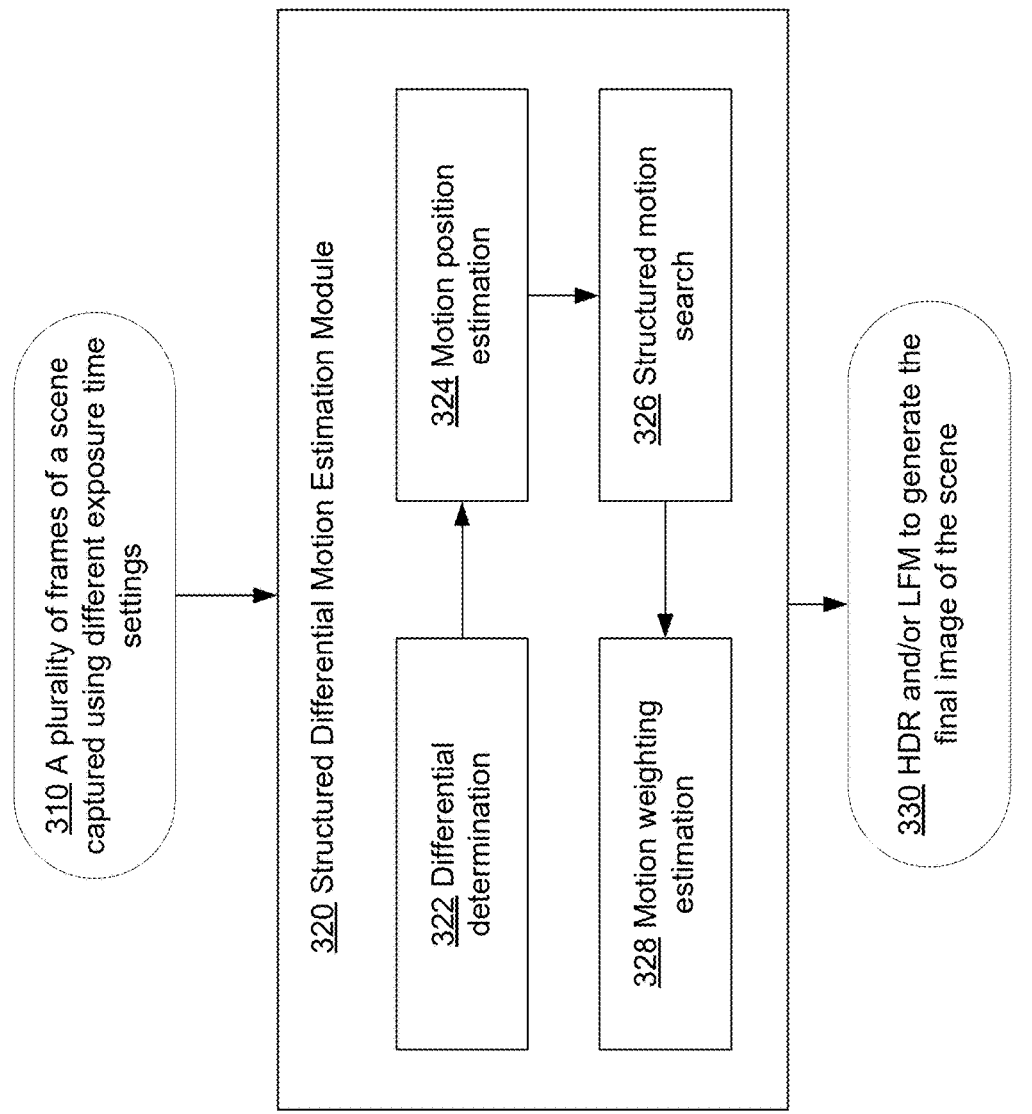
FIG. 3 illustrates an exemplary system implementing a structured differential estimation method for detecting LED flickers and moving objects within HDR imagery, according to some embodiments of this specification.

FIG. 3 illustrates an exemplary system 300 implementing a structured differential estimation method for detecting LED flickers and moving objects within HDR imagery, according to some embodiments of this specification.

As illustrated in FIG. 1B, a scene may encompass one or more moving objects, one or more LED sources, one or more areas nearing saturation (e.g., areas close to the sun), or any combination thereof. The objective of system 300 is to differentiate LED sources from moving objects, while preventing the misidentification of saturated areas as LED sources. Upon detecting the LED sources, suitable LFM techniques can be applied to the pixels associated with these sources, thereby generating a higher quality HDR image of the scene. Various practical applications can leverage these enhanced HDR images for subsequent object identification tasks, such as in autonomous vehicles, surveillance systems, and so forth.

As depicted, system 300 may initiate with an input module 310, which receives multiple frames of a scene captured by an image sensor configured with various exposure settings. The image sensor could be a spatially multiplexed image sensor as illustrated in FIG. 1C. However, this disclosure does not confine the tools or sensors used for capturing the multiple frames with different exposure settings. A person skilled in the art would understand that other image sensors could be employed to acquire the input frames, such as HDR sensors, multi-bucket sensors, or time-resolved single-photon sensors, among others.

The input module 310 may then feed the plurality of frames into the structured differential motion estimation module 320 to extract the movement patterns of moving objects and LED flickers, thereby detecting the LED sources. In some embodiments, the structured differential motion estimation module 320 may include four sub-modules, including a differential determination sub-module 322, a motion position estimation sub-module 324, a structured motion search sub-module 326, and a motion weighting estimation module 328.

In some embodiments, The differential determination sub-module 322 is designed to identify the boundaries or edges of objects that exhibit changes in pixel values (referred to as changing objects), based on pixel-intensity variations within each frame (i.e., intra-frame edge determination). For instance, a moving window (e.g., covering 3 or more pixels at a time, with the moving step being less than or equal to the size of the moving window) systematically scans across the frame to locate the area where the rate of change is the highest. This rate of change can be quantified as the differential among neighboring pixels within the moving window. For example, the "differential" of a pixel may be determined based on the difference between the intensity values of neighboring pixels, which represents a rate of intensity change (or changing speed) across neighboring pixels. This procedure may be termed as intra-frame iteration.

In some embodiments, intra-frame iterations can be executed in parallel across multiple frames, with each iteration focusing on a single frame (one exposure setting). In certain embodiments, the pixel values (e.g., brightness) of a first frame captured with a shorter exposure time may initially be aligned with the pixel values of a second frame captured with a longer exposure time prior to performing the intra-frame iterations. For instance, assuming four exposure times, $L_0$, $L_1$, $L_2$, and $L_3$, are used to capture the plurality of frames, the following formulas may be used to perform the brightness alignment:

$$L_{01} = L_0 \times m_{01}$$

$$L_{12} = L_1 \times m_{12}$$

$$L_{23} = L_2 \times m_{23}$$

where $L_{01}$ is the brightness after brightness $L_0$ is aligned to brightness $L_1$; $L_{12}$ is the brightness after brightness $L_1$ is aligned to brightness $L_2$; $L_{23}$ is the brightness after brightness $L_2$ is aligned to brightness $L_3$; $m_{01}$ is the brightness ratio between $L_0$ and $L_1$; $m_{12}$ is the brightness ratio between $L_1$ and $L_2$; $m_{23}$ is the brightness ratio between $L_2$ and $L_3$. In some embodiments, $m_{01}$, $m_{12}$, and $m_{23}$ may be identical.

After the alignment, the following formulas may be used to determine the differentials of pixels within each frame (using the aligned pixel values/brightness) using a moving window with size of 3 pixels:

$$i_{01,0} = \arg \max_{\{i\}}\{|L_{01}(i-1) - 2 \times L_{01}(i) + L_{01}(i+1)|\} \quad (1)$$

$$j_{01,1} = \arg \max_{\{i\}}\{|L_1(i-1) - 2 \times L_1(i) + L_1(i+1)|\} \quad (2)$$

$$i_{12,1} = \arg \max_{\{i\}}\{|L_{12}(i-1) - 2 \times L_{12}(i) + L_{12}(i+1)|\} \quad (3)$$

$$j_{12,2} = \arg \max_{\{i\}}\{|L_2(i-1) - 2 \times L_2(i) + L_2(i+1)|\} \quad (4)$$

$$i_{23,2} = \arg \max_{\{i\}}\{|L_{23}(i-1) - 2 \times L_{23}(i) + L_{23}(i+1)|\} \quad (5)$$

$$j_{23,3} = \arg \max_{\{i\}}\{|L_3(i-1) - 2 \times L_3(i) + L_3(i+1)|\} \quad (6)$$

where i indicates the position of shorter exposure; j presents the position of longer exposure.

Figure 4:
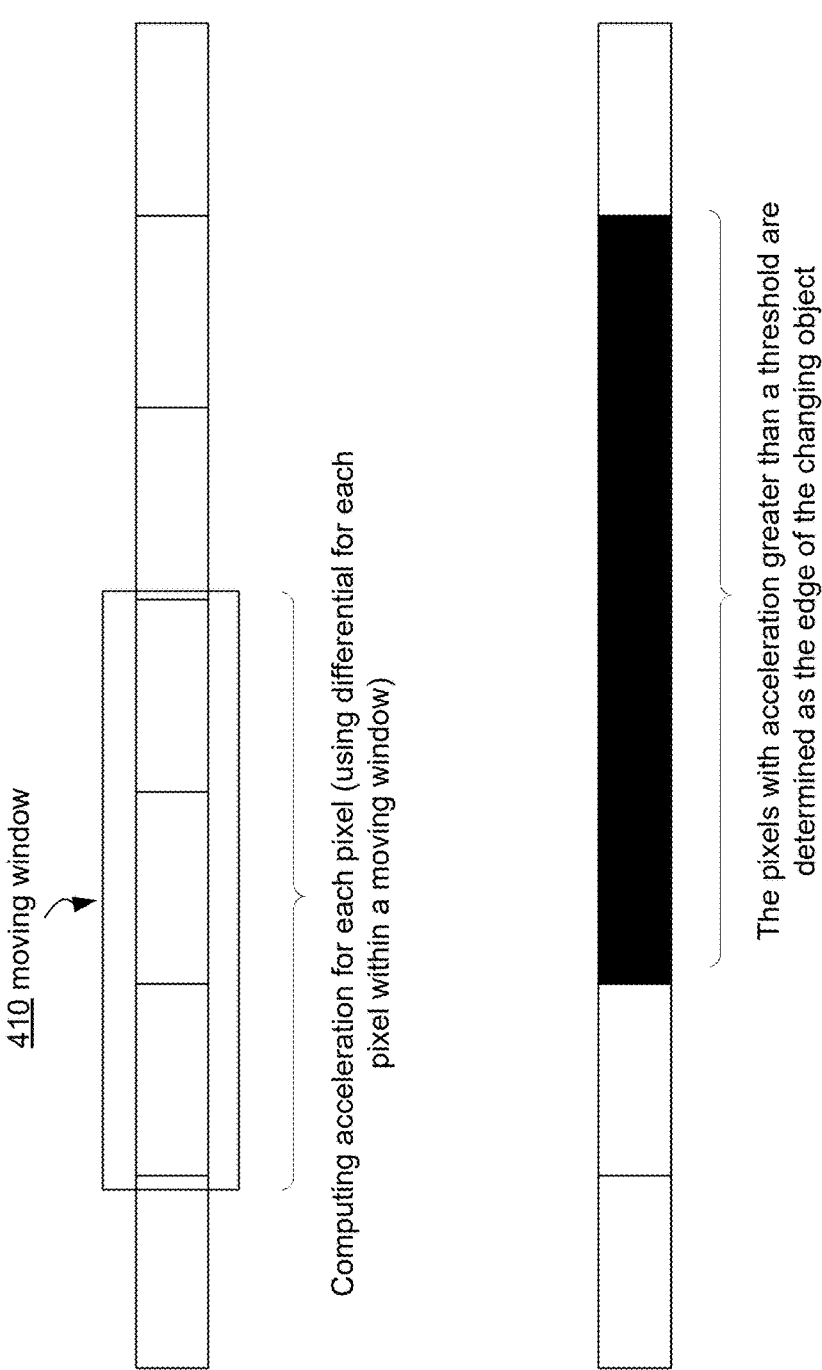
FIG. 4 illustrates an exemplary process for motion position estimation using differentials in the structured differential estimation method, according to some embodiments of this specification.

An example process of intra-frame edge determination is illustrated in FIG. 4, in which a moving window 410 (with a size of 3 pixels) iterates through the frame to determine the acceleration for each pixel based on pixel values in the moving window 410. The computation may be based on the formulas (1)-(6). For instance, if the frame corresponds to the shortest exposure time $L_0$ and is aligned to $L_1$, the frame may be referred to as $L_{01}$. Formula (1) may be used to determine the differential of the pixel centered in the moving window. As another example, for the frame with exposure time $L_1$ (the second shortest exposure time), both formulas (2) and (3) may be used, in which formula (2) directly uses the pixel values of the frame (captured using exposure time $L_1$), and formula (3) uses the aligned pixel values of the frame (aligned to exposure time $L_2$, denoted as $L_{12}$) to determine the differential of the pixel centered in the moving window. In other words, the frames corresponding to exposure times other than the shortest and the longest exposure times will undergo two rounds of intra-frame edge determination.

After the moving window iterates through the aligned frame, the pixels with differentials (i.e., the acceleration or the pixel value changing speed) greater than a threshold may be determined as the edge of the changing object. Note that this changing object could be a moving object (e.g., a vehicle) or an LED source.

Referring back to FIG. 3, once the differential determination module 322 identifies the edges of the changing objects in each frame, the motion position estimation module 324 may be configured to execute cross-frame iteration. This process determines the motion positions of the changing object across different frames, thereby establishing a moving path of the changing object from a frame with a shorter exposure time to a frame with a longer exposure time. The motion positions of the changing object across different frames denote a correspondence between a cluster of pixels (located on the determined edges of the changing object) in the frame with the shorter exposure time and a corresponding cluster of pixels in the frame with the longer exposure time. This correspondence indicates the changing object's moving path between the shorter and longer exposure times.

Figure 5:
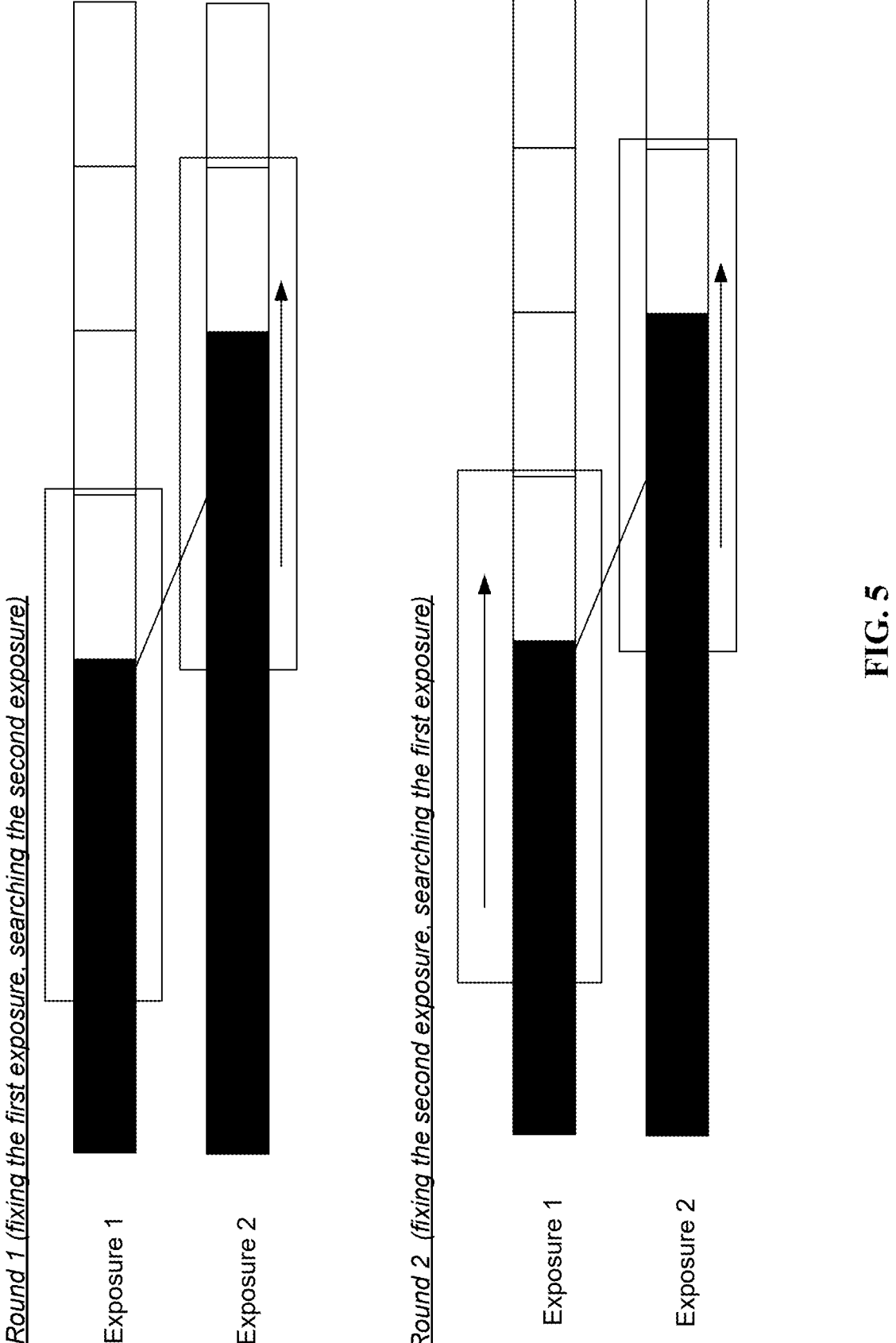
FIG. 5 illustrates an exemplary process for structured motion search in the structured differential estimation method, according to some embodiments of this specification.

In some embodiments, the corresponding motion positions across different frames may be determined using the exemplary process illustrated in FIG. 5. As shown in FIG. 5, at least two rounds of iterations may be performed to identify the corresponding motion positions of the changing object. Assuming a searching window with a size of 3 pixels is used, the process may include at least the following two rounds of iteration.

Round 1: The search window iterates through the edges of the changing object in the first frame using the shorter exposure, i.e., exposure 1, to determine a first cluster of pixels within the search window, the first cluster of pixels having a largest differential (changing speed) in the first frame. Then the moving window covering the first cluster of pixels is fixed, another search window iterates through the second frame (with the longer exposure, i.e., exposure 2) to search for a second cluster of pixels corresponding to the first cluster of pixels. The degree of correspondences is quantified by the difference between the first cluster of pixels and the second cluster of pixels. This around of process may also be referred to as "fixing the position in the frame of shorter exposure, searching for corresponding position in the frame of longer exposure."

Round 2: The reverse of the process in round 1 is performed. A search window iterates through the edges of the changing object in the second frame using the longer exposure, i.e., exposure 2, to determine a third cluster of pixels with the largest differential in the second frame. The third cluster of pixels may be the same as the second cluster of pixels identified in Round 1. Then the third cluster of pixels are fixed, another search window iterates through the first frame to search for a fourth cluster of pixels corresponding to the third cluster of pixels. Again, the degree of correspondences may be quantified by the difference between the third cluster of pixels and the fourth cluster of pixels. This around of process may similarly be referred to as "fixing the position in the frame of longer exposure, searching for corresponding position in the frame of shorter exposure."

Following the cross-frame iterations, two pixel clusters from the two frames exhibiting the smallest difference may be identified. This identification could be based, for example, on the difference between the first and second pixel clusters, and the difference between the third and fourth pixel clusters. The pair with the smallest difference may be designated as the moving path of the changing object from the first frame to the second frame.

For example, the following formulas may be used to identify the moving paths of the changing object cross each pair of frames:

$$\left\{i'_{01,0}, j'_{01,1}\right\} = \arg \min_{\{i,j\}} \left\{ \begin{array}{l} (|L_{01}(i_{01,0}-1)-L_1(j-1)| + 2\times|L_{01}(i_{01,0})-L_1(j)| + |L_{01}(i_{01,0}+1)-L_1(j+1)|+2) >> 2, \\ (|L_{01}(i-1)-L_1(j_{01,1}-1)| + 2\times|L_{01}(i)-L_1(j_{01,1})| + |L_{01}(i+1)-L_1(j_{01,1}+1)|+2) >> 2 \end{array} \right\} \quad (7)$$

$$\left\{i'_{12,1}, j'_{12,2}\right\} = \arg \min_{\{i,j\}} \left\{ \begin{array}{l} (|L_{01}(i_{01,0}-1)-L_1(j-1)| + 2\times|L_{01}(i_{01,0})-L_1(j)| + |L_{01}(i_{01,0}+1)-L_1(j+1)|+2) >> 2, \\ (|L_{01}(i-1)-L_1(j_{01,1}-1)| + 2\times|L_{01}(i)-L_1(j_{01,1})| + |L_{01}(i+1)-L_1(j_{01,1}+1)|+2) >> 2 \end{array} \right\} \quad (8)$$

$$\left\{i'_{23,2}, j'_{23,2}\right\} = \arg \min_{\{i,j\}} \left\{ \begin{array}{l} (|L_{23}(i_{23,2}-1)-L_3(j-1)| + 2\times|L_{23}(i_{23,2})-L_3(j)| + |L_{23}(i_{23,2}+1)-L_3(j+1)|+2) >> 2, \\ (|L_{23}(i-1)-L_3(j_{23,3}-1)| + 2\times|L_{23}(i)-L_3(j_{23,3})| + |L_{23}(i+1)-L_3(j_{23,3}+1)|+2) >> 2 \end{array} \right\} \quad (9)$$

where the third pixel values in formulas (7)-(9) are right-shifted by 2 (i.e., divided by $2^2=4$) for normalization purpose.

Referring back to FIG. 3 again, after the moving paths are determined cross the frames, the structured motion search module 326 may be configured to determine the amount of movement of the changing object by using a structured motion search scheme, more specifically, a hierarchical motion search scheme. The purpose of the hierarchical motion search is to exclude moving paths that involve pixels approximating saturation within a certain threshold. This step is designed to prevent the misidentification of areas near a brightness spot as an LED source (e.g., an area in the sky close to the sun). For instance, the amount of movement between each pair of frames may be computed with following formulas:

$$D_{01} = \min_{\{i,j\}} \left\{ \begin{array}{l} (|L_{01}(i_{01,0}-1)-L_1(j-1)| + 2\times|L_{01}(i_{01,0})-L_1(j)| + |L_{01}(i_{01,0}+1)-L_1(j+1)|+2) >> 2, \\ (|L_{01}(i-1)-L_1(j_{01,1}-1)| + 2\times|L_{01}(i)-L_1(j_{01,1})| + |L_{01}(i+1)-L_1(j_{01,1}+1)|+2) >> 2 \end{array} \right\} \quad (10)$$

$$D_{12} = \min_{\{i,j\}} \left\{ \begin{array}{l} (|L_{12}(i_{12,1}-1)-L_2(j-1)| + 2\times|L_{12}(i_{12,1})-L_2(j)| + |L_{12}(i_{12,1}+1)-L_2(j+1)|+2) >> 2, \\ (|L_{12}(i-1)-L_1(j_{12,2}-1)| + 2\times|L_{12}(i)-L_2(j_{12,2})| + |L_{12}(i+1)-L_2(j_{12,2}+1)|+2) >> 2 \end{array} \right\} \quad (11)$$

$$D_{23} = \min_{\{i,j\}} \left\{ \begin{array}{l} (|L_{23}(i_{23,2}-1)-L_3(j-1)| + 2\times|L_{23}(i_{23,2})-L_3(j)| + |L_{23}(i_{23,2}+1)-L_3(j+1)|+2) >> 2, \\ (|L_{23}(i-1)-L_3(j_{23,3}-1)| + 2\times|L_{23}(i)-L_3(j_{23,3})| + |L_{23}(i+1)-L_3(j_{23,3}+1)|+2) >> 2 \end{array} \right\} \quad (12)$$

Then the following hierarchical search scheme may be applied to exclude the moving paths containing motion positions close to saturation, thereby determining the amount of movement (denoted as mt) of the changing object across the plurality of frames.

$$mt = \begin{cases} D_{01} & \text{if } L_3(j'_{23,3}) > \alpha \,\&\, L_2(j'_{12,2}) > \alpha \quad (13) \\ \max\{D_{01}, D_{12}\}, & \text{if } L_3(j'_{23,3}) > \alpha \\ \max\{D_{01}, D_{12}, D_{23}\} & \text{else} \end{cases}$$

where α refers to the threshold value close to saturation.

Formula (13) shows that if the aligned pixel values in $L_2$ and $L_3$ frames are close to saturation, the amount of movement between $L_0$ and $L_1$ will be used to represent the overall amount of movement of the changing object. In other cases, the maximum amount of movement between two neighboring frames will be used to represent the overall amount of movement of the changing object.

After obtaining the amount of movement of the changing object, the motion weighting estimation module 328 may be configured to determine how likely the changing object is an LED source or a moving object, and assign a fusion weight based on the determined likelihood. The fusion weight determines how the final image of the scene will be generated based on the plurality of frames of the scene.

As explained in FIG. 2, the amount of movement of an LED source tends to be much greater than the amount of movement of a moving object. Therefore, in some embodiments, the following formula may be used to determine the fusion weight.

$$\text{wt}_{LFM} = \begin{cases} 1 & \text{if } mt \geq Th_1 \quad (14) \\ 0, & \text{if } mt \leq Th_0 \\ 1\times(mt-Th_0)\times\text{Slope} & \text{else} \end{cases}$$

where $Th_0$ and Thy are two movement thresholds, $Th_1$ being greater than $Th_0$, the fusion weight $\text{wt}_{LFM}$ determines whether LFM needs to be performed, and Slope is a discount factor.

With the fusion weight, the system 300 may proceed to the final step 330 to generate the final image of the scene using the following expression:

$$L_{final} = \text{wt}_{LFM} \times L_3 + (1 - \text{wt}_{LFM}) \times L_{fusion} \quad (15)$$

where $L_{final}$ represents the final image of the scene, $L_3$ refers to the frame of the longest exposure time, and $L_{fusion}$ refers to the HDR fusion result based on the plurality of frames.

Figure 6:
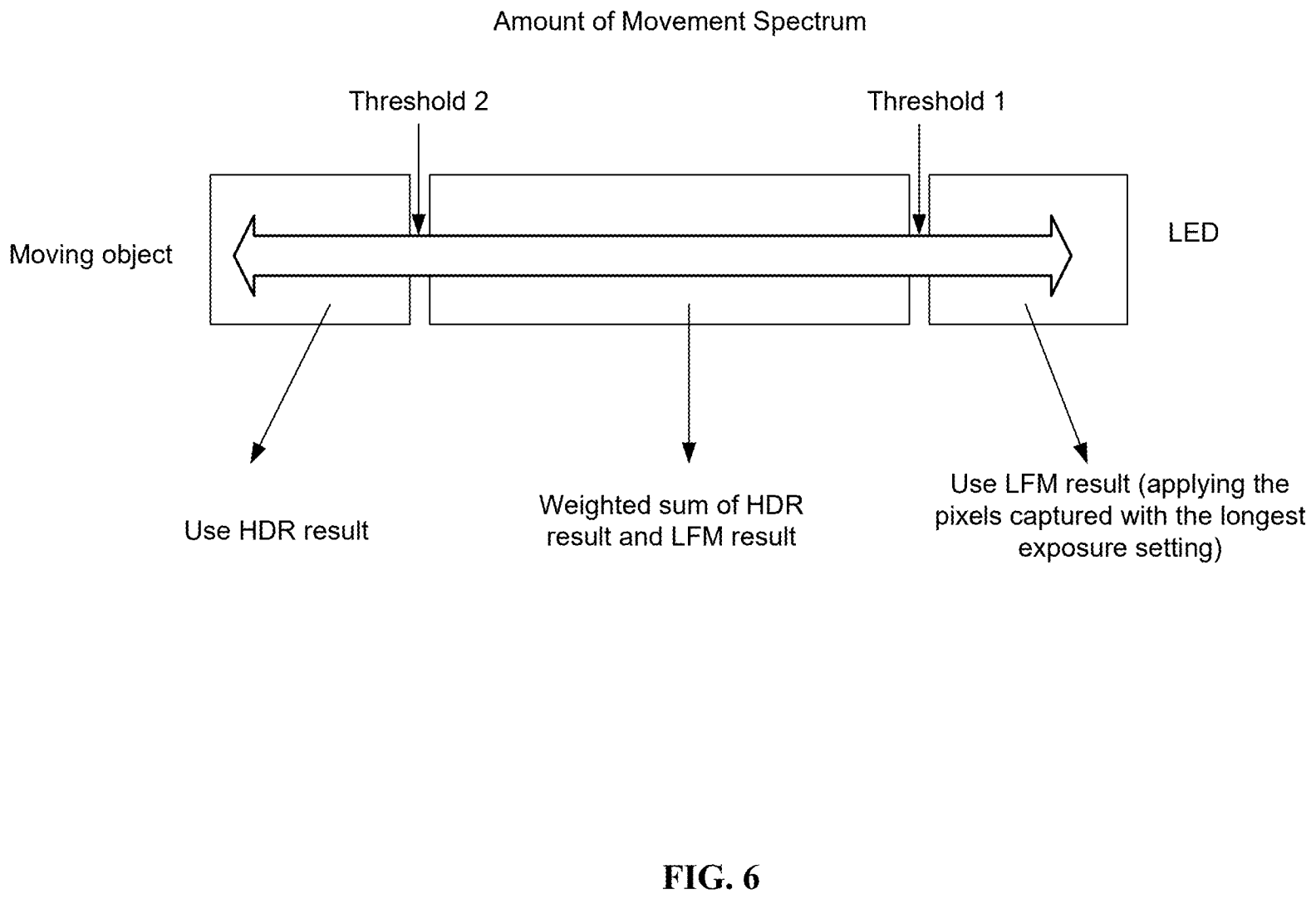

Formulas (14) and (15) can be illustrated by the diagram in FIG. 6, which represents a spectrum depicting the degree (or amount) of movement along a changing object's trajectory. When the movement surpasses a first threshold (threshold 1 in FIG. 6 or $Th_1$ in formula (14)), the changing object is identified as an LED source. Conversely, if the movement falls below a second threshold (threshold 2 in FIG. 6 or $Th_0$ in formula (14)), the changing object is determined as a moving object, the changing object is classified as a moving object. If the changing object is recognized as the LED source, techniques such as LED Flicker Mitigation (LFM) can be applied to determine the final pixel values for the object. For instance, pixel values from the frame with the longest exposure time can be incorporated into the final scene image to mitigate LED flickering. In cases where the changing object is identified as a moving object, High Dynamic Range (HDR) fusion can be performed on the plurality of frames to produce the HDR image of the scene.

If the amount of movement is between the two thresholds (between threshold 1 and threshold 2 in FIG. 6 or between $Th_0$ and $Th_1$ in formula (14)), a hybrid fusion approach may be employed, leveraging both the LFM and HDR fusion results. In other words, the final scene image may be a weighted combination of (1) pixel values of the changing object in the frame captured under the longest exposure setting (LFM component) and (2) the HDR fusion result obtained from multiple frames (HDR fusion component).

Figure 7B:
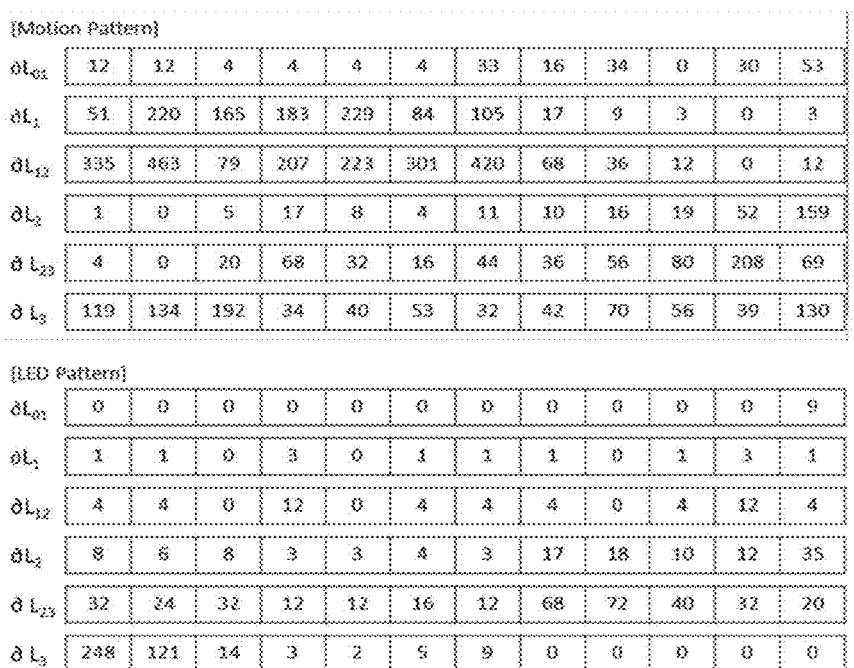

FIGS. 7A and 7B illustrate an exemplary implementation of the structured differential estimation method in distinguishing LED flickers and moving objects, according to some embodiments of this specification.

In this particular example, the initial pixel intensity vectors, labeled 700, represent the values from a selected pixel cluster across several HDR frames, capturing a scene that includes both an LED source and a moving object. For illustration purposes, the pixel intensity vectors for the LED source and the moving object are separated to highlight the different motion patterns and amounts of movements.

As an initial step, these original vectors 700 undergo a process of pixel intensity enhancement. This enhancement involves aligning vectors from shorter exposure times with those from longer exposure times. The result of this enhancement is a set of aligned pixel intensity vectors, denoted as 710. It's important to note that the count of these aligned vectors 710 is one fewer than the original vectors 700. This is because the vectors associated with the longest exposure time do not undergo the enhancement step.

Subsequently, the process involves determining the acceleration (using the differential of the pixel values within a moving window) of the pixels. Formulas (1)-(6) may be applied to reach the results shown in 720 of FIG. 7B.

Then the motion patterns and corresponding amount of movement may be determined by applying equations (10)-(12) to reach the results shown in 730 of FIG. 7B. As shown the amount of movement for the moving object is determined as 307, and the amount of movement for the LED source is determined as 1700.

By quantifying these movement magnitudes, it becomes possible to discern whether the pixel cluster is capturing LED flickers or a moving object. This determination is crucial in deciding whether to apply LED Flicker Mitigation (LFM), High Dynamic Range (HDR) fusion, or a combination of both, in order to produce the final HDR image from the collected HDR frames. For instance, formulas (14) and (15) may be applied to generate the final image for the scene based on this determination.

FIG. 8 illustrates an exemplary method for detecting LED flickers and moving objects within HDR imagery, according to some embodiments of this specification. The steps 810-860 illustrated in FIG. 8 are for illustration purposes. Depending on the implementation, the method 800 may include fewer, more, or alternative steps.

As shown in FIG. 8, process 800 may include obtaining a plurality of frames of a scene captured by an image sensor configured with a plurality of exposure settings (block 810). For example, device may obtain a plurality of frames of a scene captured by an image sensor configured with a plurality of exposure settings, as described above.

As also shown in FIG. 8, process 800 may include determining edges of a changing object in the scene based on pixel values in the plurality of frames, where the changing object may include a moving object or an LED source (block 820). For example, device may determine edges of a changing object in the scene based on pixel values in the plurality of frames, where the changing object may include a moving object or an led source, as described above.

As further shown in FIG. 8, process 800 may include determining a moving path of the changing object between a first frame captured using a shorter exposure setting and a second frame captured using a longer exposure setting based on pixel values of the edges of the changing object in the first frame and the second frame (block 830). For example, device may determine a moving path of the changing object between a first frame captured using a shorter exposure setting and a second frame captured using a longer exposure setting based on pixel values of the edges of the changing object in the first frame and the second frame, as described above.

As also shown in FIG. 8, process 800 may include determining an amount of movement of the changing object based on the moving path of the changing object (block 840). For example, device may determine an amount of movement of the changing object based on the moving path of the changing object, as described above.

As further shown in FIG. 8, process 800 may include determining, based on the amount of movement of the changing object, a likelihood of the changing object being the moving object or the LED source (block 850). For example, device may determine, based on the amount of movement of the changing object, a likelihood of the changing object being the moving object or the led source, as described above.

As also shown in FIG. 8, process 800 may include generating an image of the scene using the plurality of frames by performing High Dynamic Range (HDR) fusion and LFM based on the likelihood of the changing object being the moving object or the LED source (block 860). For example, device may generate an image of the scene using the plurality of frames by performing high dynamic range (HDR) fusion and LFM based on the likelihood of the changing object being the moving object or the led source, as described above.

Process 800 may include additional implementations, such as any single implementation or any combination of implementations described below and/or in connection with one or more other processes described elsewhere herein. In a first implementation, the determining the likelihood of the changing object being the moving object or the LED source may include: in response to the amount of movement being greater than a first threshold, determining that the changing object is likely the LED source; and in response to the amount of movement being smaller than a second threshold, determining that the changing object is likely the moving object.

In a second implementation, alone or in combination with the first implementation, the generating the image of the scene may include: in response to the amount of movement being greater than a first threshold, performing LFM by using pixels of the changing object in a frame that is captured under a longest exposure setting to generate the image of the scene.

In a third implementation, alone or in combination with the first and second implementation, the generating the image of the scene may include: in response to the amount of movement being smaller than a second threshold, using an HDR fusion result of the plurality of frames as the image of the scene.

In a fourth implementation, alone or in combination with one or more of the first through third implementations, the generating the image of the scene may include: in response to the amount of movement being between a first threshold and a second threshold, generating the image of the scene based on a weighted sum of (1) pixel values of the changing object in a frame that is captured under a longest exposure setting and (2) an HDR fusion result of the plurality of frames.

In a fifth implementation, alone or in combination with one or more of the first through fourth implementations, the determining the edges of the changing object in the scene based on pixel values in the plurality of frames may include: performing intra-frame iteration to determine the edges, where the intra-frame iteration may include: within a frame captured with one of the plurality of exposure settings, using a search window to iterate through pixels within the frame; and determining a pixel value differential of a pixel centered within the search window based on pixel values of the pixel and neighboring pixels, wherein the pixel value differential of the pixel indicates a rate of intensity change across neighboring pixels, where pixels in the frame with pixel value differentials greater than a threshold are determined as part of the edges of the changing object in the frame.

In a sixth implementation, alone or in combination with one or more of the first through fifth implementations, the determining the moving path of the changing object between the first frame captured using the shorter exposure setting and the second frame captured using the longer exposure setting may include: performing cross-frame iteration to determine the moving path, where the cross-frame iteration may include: identifying, in the first frame captured with the shorter exposure setting, a first cluster of pixels having a pixel with a largest differential in the first frame; searching for, using a moving search window in the second frame with the longer exposure setting, a second cluster of pixels corresponding to the first cluster of pixels in the first frame, where the first cluster of pixels and the second cluster of pixels have a smallest difference; identifying, in the second frame with the longer exposure setting, a third cluster of pixels with a largest differential in the second frame; searching for, using a moving search window in the first frame with the shorter exposure setting, a fourth cluster of pixels corresponding to the third cluster of pixels in the second frame; determining corresponding clusters of pixels between the first frame and the second frame based on differences between the first cluster of pixels and the second cluster of pixels, and between the third cluster of pixels and the fourth cluster of pixels; and determining the moving path between the first frame and the second frame based on the corresponding clusters of pixels.

In a seventh implementation, alone or in combination with one or more of the first through sixth implementations, the determining the amount of movement of the changing object based on the moving path of the changing object may include: determining a largest movement of the changing object between different frames as the amount of movement of the changing object using a hierarchical motion search, where the hierarchical motion search excludes the amount of movement when corresponding pixel values in the moving path approximate saturation within a threshold.

In an eighth implementation, alone or in combination with one or more of the first through seventh implementations, the capturing the plurality of frames of the scene using the plurality of exposure settings may include: capturing the plurality of frames of the scene using a spatially multiplexed image sensor, where the spatially multiplexed image sensor may include a plurality of pixel groups, each pixel group may include a plurality of pixels configured with the plurality of exposure settings, and the plurality of frames respectively corresponds to a plurality of exposure settings.

In a ninth implementation, alone or in combination with one or more of the first through eighth implementations, the plurality of exposure settings correspond to linearly increased exposure times by a predetermined factor.

In a tenth implementation, alone or in combination with one or more of the first through ninth implementations, the determining edges of the changing object in the scene may include: performing pixel intensity alignment between a pair of the plurality of frames by using the predetermined factor, thereby obtaining a plurality of vectors of aligned pixel intensities for the pair of frames.

Although FIG. 8 shows example blocks of process 800, in some implementations, process 800 may include additional blocks, fewer blocks, different blocks, or differently arranged blocks than those depicted in FIG. 8. Additionally, or alternatively, two or more of the blocks of process 800 may be performed in parallel.

Figure 9:
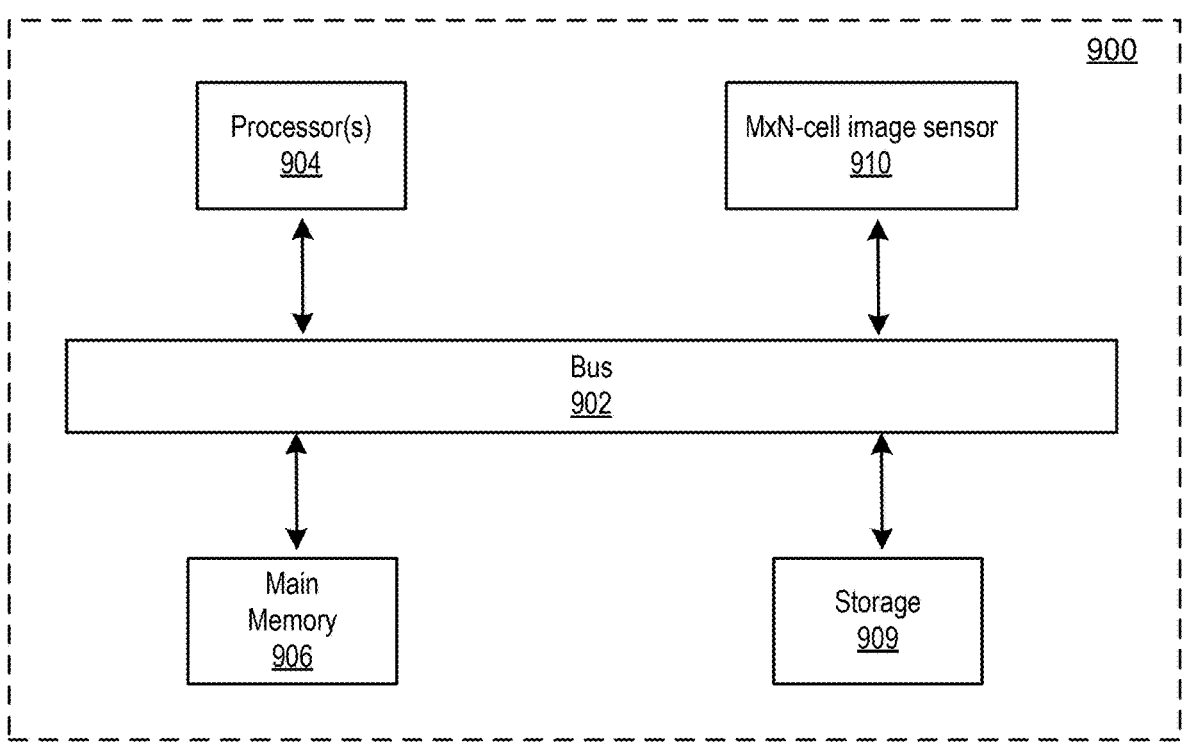
FIG. 9 is a schematic diagram of an example computing system for detecting LED flickers and moving objects within HDR imagery, according to some embodiments of this specification.

FIG. 9 is a schematic diagram of an example computing system for detecting LED flickers and moving objects within HDR imagery, according to some embodiments of this specification. The computer system 900 may be implemented in any of the components of the systems illustrated in FIGS. 1A-5. One or more of the example methods illustrated by FIGS. 1A-5 may be performed by one or more implementations of the computer system 900.

The computer system 900 may include a bus 902 or another communication mechanism for communicating information, and one or more hardware processor(s) 904 coupled with bus 902 for processing information. Hardware processor(s) 904 may be, for example, one or more general purpose microprocessors.

The computer system 900 may also include a main memory 906, such as a random-access memory (RAM), cache and/or other dynamic storage devices, coupled to bus 902 for storing information and instructions executable by processor(s) 904. Main memory 906 also may be used for storing temporary variables or other intermediate information during execution of instructions by processor(s) 904. Such instructions, when stored in storage media accessible to processor(s) 904, render computer system 900 into a special-purpose machine that is customized to perform the operations specified in the instructions. The computer system 900 may further include a read only memory (ROM) 909 or other static storage device coupled to bus 902 for storing static information and instructions for processor(s) 904. A storage device 909, such as a magnetic disk, optical disk, or USB thumb drive (flash drive), etc., may be provided and coupled to bus 902 for storing information and instructions.

The computer system 900 may implement the techniques described herein using customized hard-wired logic, one or more ASICs or FPGAs, firmware and/or program logic which in combination with the computer system causes or programs computer system 900 to be a special-purpose machine. According to one embodiment, the operations, methods, and processes described herein are performed by computer system 900 in response to processor(s) 904 executing one or more sequences of one or more instructions contained in main memory 906. Such instructions may be read into main memory 906 from another storage medium, such as storage device 909. Execution of the sequences of instructions contained in main memory 906 may cause processor(s) 904 to perform the process steps described herein. In alternative embodiments, hard-wired circuitry may be used in place of or in combination with software instructions.

The main memory 906, the ROM 909, and/or the storage device 909 may include non-transitory storage media. The term "non-transitory media," and similar terms, as used herein refers to media that stores data and/or instructions that cause a machine to operate in a specific fashion, that excludes transitory signals. Such non-transitory media may comprise non-volatile media and/or volatile media. Non-volatile media includes, for example, optical or magnetic disks, such as storage device 909. Volatile media includes dynamic memory, such as main memory 906. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

The computer system 900 may include a M×N-cell image sensor 910 (or generally called spatially multiplexed image sensor) coupled to bus 902. The M×N-cell image sensor 910 may include a plurality of pixel groups, each pixel group having a M×N pixels configured with color filters of a same color such that the M×N pixels in each pixel group capture a same color.

The computer system 900 can send messages and receive data, including program code, through the network(s), network link, and M×N-cell image sensor 910. In the Internet example, a server might transmit a requested code for an application program through the Internet, the ISP, the local network, and the M×N-cell image sensor 910.

The received code may be executed by processor(s) 904 as it is received, and/or stored in storage device 909, or other non-volatile storage for later execution.

Each process, method, and algorithm described in the preceding sections may be embodied in, and fully or partially automated by, code modules executed by one or more computer systems or computer processors comprising computer hardware. The processes and algorithms may be implemented partially or wholly in the application-specific circuit.

When the functions disclosed herein are implemented in the form of software functional units and sold or used as independent products, they can be stored in a processor executable non-volatile computer-readable storage medium. Particular technical solutions disclosed herein (in whole or in part) or aspects that contribute to current technologies may be embodied in the form of a software product. The software product may be stored in a storage medium, comprising a number of instructions that cause a computing device (which may be a personal computer, a server, a network device, and the like) to execute all or some steps of the methods of the embodiments of the present application. The storage medium may comprise a flash drive, a portable hard drive, ROM, RAM, a magnetic disk, an optical disc, another medium operable to store program code, or any combination thereof.

Particular embodiments further provide a system comprising a processor and a non-transitory computer-readable storage medium storing instructions executable by the processor to cause the system to perform operations corresponding to steps in any method of the embodiments disclosed above. Particular embodiments further provide a non-transitory computer-readable storage medium configured with instructions executable by one or more processors to cause the one or more processors to perform operations corresponding to steps in any method of the embodiments disclosed above.

Embodiments disclosed herein may be implemented through a cloud platform, a server or a server group (hereinafter collectively the "service system") that interacts with a client. The client may be a terminal device, or a client registered by a user at a platform, where the terminal device may be a mobile terminal, a personal computer (PC), or any device that may be installed with a platform application program.

The various features and processes described above may be used independently of one another or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The exemplary systems and components described herein may be configured differently than described. For example, elements may be added to, removed from, or rearranged compared to the disclosed example embodiments.

The various operations of example methods described herein may be performed, at least partially, by an algorithm. The algorithm may be comprised in program codes or instructions stored in a memory (e.g., a non-transitory computer-readable storage medium described above). Such algorithm may comprise a machine learning algorithm. In some embodiments, a machine learning algorithm may not explicitly program computers to perform a function but can learn from training data to make a prediction model that performs the function.

The various operations of example methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Any process descriptions, elements, or blocks in the flow diagrams described herein and/or depicted in the attached figures should be understood as potentially representing modules, segments, or sections of code which include one or more executable instructions for implementing specific logical functions or steps in the process. Alternate implementations are included within the scope of the embodiments described herein in which elements or functions may be deleted or executed out of order from that shown or discussed, including substantially concurrently or in reverse order, depending on the functionality involved, as would be understood by those skilled in the art.

As used herein, "or" is inclusive and not exclusive, unless expressly indicated otherwise or indicated otherwise by context. Therefore, herein, "A, B, or C" means "A, B, A and B, A and C, B and C, or A, B, and C," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context. Moreover, plural instances may be provided for resources, operations, or structures described herein as a single instance. Additionally, boundaries between various resources, operations, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

The term "include" or "comprise" is used to indicate the existence of the subsequently declared features, but it does not exclude the addition of other features. Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

What is claimed is:

1. An image processing method for LFM (LED Flicker Mitigation), comprising:
   obtaining a plurality of frames of a scene captured by an image sensor configured with a plurality of exposure settings;
   determining edges of a changing object in the scene based on pixel values in the plurality of frames, wherein the changing object comprises a moving object or an LED source;
   determining a moving path of the changing object between a first frame captured using a shorter exposure setting and a second frame captured using a longer exposure setting based on pixel values of the edges of the changing object in the first frame and the second frame;
   determining an amount of movement of the changing object based on the moving path of the changing object;
   determining, based on the amount of movement of the changing object, a likelihood of the changing object being the moving object or the LED source; and
   generating an image of the scene using the plurality of frames by performing High Dynamic Range (HDR) fusion and LFM based on the likelihood of the changing object being the moving object or the LED source.

2. The image processing method of claim 1, wherein the determining the likelihood of the changing object being the moving object or the LED source comprises:
   in response to the amount of movement being greater than a first threshold, determining that the changing object is likely the LED source; and
   in response to the amount of movement being smaller than a second threshold, determining that the changing object is likely the moving object.

3. The image processing method of claim 1, wherein the generating the image of the scene comprises:
   in response to the amount of movement being greater than a first threshold, performing LFM by using pixels of the changing object in a frame that is captured under a longest exposure setting to generate the image of the scene.

4. The image processing method of claim 1, wherein the generating the image of the scene comprises:
   in response to the amount of movement being smaller than a second threshold, using an HDR fusion result of the plurality of frames as the image of the scene.

5. The image processing method of claim 1, wherein the generating the image of the scene comprises:

in response to the amount of movement being between a first threshold and a second threshold, generating the image of the scene based on a weighted sum of (1) pixel values of the changing object in a frame that is captured under a longest exposure setting and (2) an HDR fusion result of the plurality of frames.

6. The image processing method of claim 1, wherein the determining the edges of the changing object in the scene based on pixel values in the plurality of frames comprises:
   performing intra-frame iteration to determine the edges, wherein the intra-frame iteration comprises:
      within a frame captured with one of the plurality of exposure settings, using a search window to iterate through pixels within the frame; and
      determining a pixel value differential of a pixel centered within the search window based on pixel values of the pixel and neighboring pixels, wherein the pixel value differential of the pixel indicates a rate of intensity change across neighboring pixels,
      wherein pixels in the frame with pixel value differentials greater than a threshold are determined as part of the edges of the changing object in the frame.

7. The image processing method of claim 6, wherein determining the moving path of the changing object between the first frame captured using the shorter exposure setting and the second frame captured using the longer exposure setting comprises:
   performing cross-frame iteration to determine the moving path, wherein the cross-frame iteration comprises:
      identifying, in the first frame captured with the shorter exposure setting, a first cluster of pixels comprising a pixel with a largest differential in the first frame;
      searching for, using a moving search window in the second frame with the longer exposure setting, a second cluster of pixels corresponding to the first cluster of pixels in the first frame, wherein the first cluster of pixels and the second cluster of pixels have a smallest difference;
      identifying, in the second frame with the longer exposure setting, a third cluster of pixels with a largest differential in the second frame;
      searching for, using a moving search window in the first frame with the shorter exposure setting, a fourth cluster of pixels corresponding to the third cluster of pixels in the second frame;
      determining corresponding clusters of pixels between the first frame and the second frame based on differences between the first cluster of pixels and the second cluster of pixels, and between the third cluster of pixels and the fourth cluster of pixels; and
      determining the moving path between the first frame and the second frame based on the corresponding clusters of pixels.

8. The image processing method of claim 1, wherein the determining the amount of movement of the changing object based on the moving path of the changing object comprises:
   determining a largest movement of the changing object between different frames as the amount of movement of the changing object using a hierarchical motion search, wherein the hierarchical motion search excludes the amount of movement when corresponding pixel values in the moving path are close to saturation within a threshold.

9. The image processing method of claim 1, wherein capturing the plurality of frames of the scene using the plurality of exposure settings comprises:

capturing the plurality of frames of the scene using a spatially multiplexed image sensor, wherein the spatially multiplexed image sensor comprises a plurality of pixel groups, each pixel group comprises a plurality of pixels configured with the plurality of exposure settings, and the plurality of frames respectively corresponds to a plurality of exposure settings.

10. The image processing method of claim 1, wherein the plurality of exposure settings correspond to linearly increased exposure times by a predetermined factor.

11. The image processing method of claim 10, wherein the determining the edges of the changing object in the scene comprises:
   performing pixel intensity alignment between a pair of the plurality of frames by using the predetermined factor, thereby obtaining a plurality of vectors of aligned pixel intensities for the pair of frames.

12. A system, comprising one or more processors and one or more non-transitory computer-readable memories coupled to the one or more processors and configured with instructions executable by the one or more processors to cause the system to perform operations comprising:
   obtaining a plurality of frames of a scene captured by an image sensor configured with a plurality of exposure settings;
   determining edges of a changing object in the scene based on pixel values in the plurality of frames, wherein the changing object comprises a moving object or an LED source;
   determining a moving path of the changing object between a first frame captured using a shorter exposure setting and a second frame captured using a longer exposure setting based on pixel values of the edges of the changing object in the first frame and the second frame;
   determining an amount of movement of the changing object based on the moving path of the changing object;
   determining, based on the amount of movement of the changing object, a likelihood of the changing object being the moving object or the LED source; and
   generating an image of the scene using the plurality of frames by performing High Dynamic Range (HDR) fusion and LFM based on the likelihood of the changing object being the moving object or the LED source.

13. The system of claim 12, wherein the determining the likelihood of the changing object being the moving object or the LED source comprises:
   in response to the amount of movement being greater than a first threshold, determining that the changing object is likely the LED source; and
   in response to the amount of movement being smaller than a second threshold, determining that the changing object is likely the moving object.

14. The system of claim 12, wherein the generating the image of the scene comprises:
   in response to the amount of movement being greater than a first threshold, performing LFM by using pixels of the changing object in a frame that is captured under a longest exposure setting to generate the image of the scene; and
   in response to the amount of movement being smaller than a second threshold, using an HDR fusion result of the plurality of frames as the image of the scene.

15. The system of claim 12, wherein the generating the image of the scene comprises:
   in response to the amount of movement being between a first threshold and a second threshold, generating the image of the scene based on a weighted sum of (1) pixel values of the changing object in a frame that is captured under a longest exposure setting and (2) an HDR fusion result of the plurality of frames.

16. The system of claim 12, wherein the determining edges of the changing object in the scene based on pixel values in the plurality of frames comprises:

performing intra-frame iteration to determine the edges, wherein the intra-frame iteration comprises:

within a frame captured with one of the plurality of exposure settings, using a search window to iterate through pixels within the frame; and determining a pixel value differential of a pixel centered within the search window based on pixel values of the pixel and neighboring pixels, wherein the pixel value differential of the pixel indicates a rate of intensity change across neighboring pixels, wherein pixels in the frame with pixel value differentials greater than a threshold are determined as part of the edges of the changing object in the frame.

17. The system of claim 16, wherein the determining the moving path of the changing object between the first frame captured using the shorter exposure setting and the second frame captured using the longer exposure setting comprises:

performing cross-frame iteration to determine the moving path, wherein the cross-frame iteration comprises:

identifying, in the first frame captured with the shorter exposure setting, a first cluster of pixels comprising a pixel with a largest differential in the first frame;

searching for, using a moving search window in the second frame with the longer exposure setting, a second cluster of pixels corresponding to the first cluster of pixels in the first frame, wherein the first cluster of pixels and the second cluster of pixels have a smallest difference;

identifying, in the second frame with the longer exposure setting, a third cluster of pixels with a largest differential in the second frame;

searching for, using a moving search window in the first frame with the shorter exposure setting, a fourth cluster of pixels corresponding to the third cluster of pixels in the second frame;

determining corresponding clusters of pixels between the first frame and the second frame based on differences between the first cluster of pixels and the second cluster of pixels, and between the third cluster of pixels and the fourth cluster of pixels; and determining the moving path between the first frame and the second frame based on the corresponding clusters of pixels.

18. The system of claim 12, wherein the determining the amount of movement of the changing object based on the moving path of the changing object comprises:

determining a largest movement of the changing object between different frames as the amount of movement of the changing object using a hierarchical motion search, wherein the hierarchical motion search excludes the amount of movement when corresponding pixel values in the moving path approximate saturation within a threshold.

19. The system of claim 12, wherein the capturing the plurality of frames of the scene using the plurality of exposure settings comprises:

capturing the plurality of frames of the scene using a spatially multiplexed image sensor, wherein the spatially multiplexed image sensor comprises a plurality of pixel groups, each pixel group comprises a plurality of pixels configured with the plurality of exposure settings, and the plurality of frames respectively corresponds to a plurality of exposure settings.

20. A non-transitory computer-readable storage medium configured with instructions executable by one or more processors to cause the one or more processors to perform operations comprising:

obtaining a plurality of frames of a scene captured by an image sensor configured with a plurality of exposure settings;

determining edges of a changing object in the scene based on pixel values in the plurality of frames, wherein the changing object comprises a moving object or an LED source;

determining a moving path of the changing object between a first frame captured using a shorter exposure setting and a second frame captured using a longer exposure setting based on pixel values of the edges of the changing object in the first frame and the second frame;

determining an amount of movement of the changing object based on the moving path of the changing object;

determining, based on the amount of movement of the changing object, a likelihood of the changing object being the moving object or the LED source; and generating an image of the scene using the plurality of frames by performing High Dynamic Range (HDR) fusion and LFM based on the likelihood of the changing object being the moving object or the LED source.

* * * * *